(12) United States Patent
Dauphin et al.

(10) Patent No.: US 10,589,848 B2
(45) Date of Patent: Mar. 17, 2020

(54) LANDING-GEAR ASSEMBLY FOR AN AIRCRAFT, THE LANDING-GEAR ASSEMBLY INCLUDING A SECONDARY SHIMMY DAMPER

(71) Applicant: SAFRAN LANDING SYSTEMS, Velizy Villacoublay (FR)

(72) Inventors: Florent Dauphin, Velizy Villacoublay (FR); Florent Fortier, Velizy Villacoublay (FR); Sébastien Dubois, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 448 days.

(21) Appl. No.: 15/395,058

(22) Filed: Dec. 30, 2016

(65) Prior Publication Data
US 2018/0111678 A1    Apr. 26, 2018

(30) Foreign Application Priority Data
Jan. 5, 2016  (FR) ..................................... 16 50054

(51) Int. Cl.
*B64C 25/62* (2006.01)
*B64C 25/50* (2006.01)
*B64C 25/34* (2006.01)

(52) U.S. Cl.
CPC .............. *B64C 25/62* (2013.01); *B64C 25/34* (2013.01); *B64C 25/50* (2013.01); *B64C 25/505* (2013.01)

(58) Field of Classification Search
CPC ........ B64C 25/34; B64C 25/50; B64C 25/505
See application file for complete search history.

(56) References Cited

U.S. PATENT DOCUMENTS

| | | | | |
|---|---|---|---|---|
| 2,620,235 A | * | 12/1952 | Butler | B64C 25/505 301/36.2 |
| 2,644,654 A | * | 7/1953 | Mercier | B64C 25/505 244/50 |
| 2,656,995 A | * | 10/1953 | Wolf | B64C 25/505 244/103 W |

(Continued)

FOREIGN PATENT DOCUMENTS

WO         00/58642 A1       10/2000

OTHER PUBLICATIONS

French Preliminary Search Report of FR 16 50054 dated Jun. 22, 2016.

*Primary Examiner* — Philip J Bonzell
*Assistant Examiner* — Tye William Abell
(74) *Attorney, Agent, or Firm* — Sughrue Mion, PLLC

(57) ABSTRACT

A landing-gear assembly (1) for an aircraft, the landing-gear assembly comprising:
an axle shaft (2);
a leg (3) presenting a first portion (3a) carrying said axle shaft (2) and a second portion (3b) connected to a carrier structure of the aircraft;
a main damper (5); and
a first secondary damper (6a) distinct from the main damper (5).
The first secondary damper (6a) is carried by the axle shaft (2) and comprises:
an inertial mass (M); and
connection means (7a) between the inertial mass (M) and the axle shaft (2) damping movements of the inertial mass (M) along a first axis (X1) of movement of the inertial mass (M) relative to the axle shaft (2), said first axis of movement (X1) extending in a plane (P) perpendicular to said steering axis (Z).

12 Claims, 4 Drawing Sheets

(56) References Cited

U.S. PATENT DOCUMENTS 2,747,818 A * 5/1956 Grudin .................. B64C 25/505
  244/50
2,970,792 A * 2/1961 Holmes ................. B64C 25/505
  244/50
3,424,406 A * 1/1969 Rumsey ................ B64C 25/505
  244/103 R

* cited by examiner

LANDING-GEAR ASSEMBLY FOR AN AIRCRAFT, THE LANDING-GEAR ASSEMBLY INCLUDING A SECONDARY SHIMMY DAMPER

The present invention relates to a landing-gear assembly for an aircraft, the landing-gear assembly including a secondary damper.

BACKGROUND OF THE INVENTION

By way of example, patent document WO 00/58642 discloses an aircraft landing-gear assembly comprising:
- an axle shaft arranged to carry wheels for enabling the aircraft to run on the ground;
- a leg presenting a first portion carrying said axle shaft and a second portion adapted to be connected to a carrier structure of the aircraft, said leg extending along a main axis of the leg passing via said first and second leg portions;
- a steering mechanism adapted to steering the first portion of the leg relative to the second portion of the leg by turning the first leg portion about a steering axis extending along the leg;
- a main damper arranged to damp axial movements of the first leg portion relative to the second leg portion; and
- a first secondary damper adapted to damping angular oscillating motion of the first leg portion relative to the second leg portion about said steering axis.

That type of aircraft landing-gear assembly is provided with a steering mechanism for steering the axle shaft that carries the wheels relative to the second leg portion that is connected to the carrier structure of the aircraft.

With that type of landing-gear assembly, while running on the ground, a vibratory phenomenon commonly known as "shimmy" may appear. That vibratory phenomenon may create discomfort, and in worst-case scenarios it can lead to certain parts of the landing-gear assembly breaking. It is thus desirable to eliminate such scenarios.

These vibratory/oscillatory phenomena depend on several factors such as the load on the landing-gear assembly, its shape, its design, its flexibility, its running speed.

In order to attenuate that phenomenon, patent document WO 00/58642 suggests fitting a particular damper, which it refers to as a "shimmy" damper, and which is referred to below as a "secondary" damper. In that patent document, the secondary damper couples together the second portion of the leg that is connected to the structure of the aircraft and the first portion of the landing-gear assembly leg that carries the axle shaft. That mechanical coupling of the first and second portions of the leg via the secondary damper (shimmy damper) serves to damp the relative angular oscillations between the first and second portions of the leg about the main axis of the leg, which in that embodiment is parallel to and coincides with the steering axis of the first leg portion.

Incorporating that type of shimmy damper into the structure of the landing gear is problematic since the secondary damper needs to be able to perform its damper function while also allowing the landing gear to pass between a deployed configuration outside the landing-gear bay and a retracted configuration in which it is located inside the landing-gear bay.

OBJECT OF THE INVENTION

An object of the present invention is to provide a landing-gear assembly for an aircraft, the landing-gear assembly including at least a first secondary damper improving the damping of shimmying of the first leg portion relative to the second leg portion, at least under certain conditions.

SUMMARY OF THE INVENTION

With a view to satisfying that object, the invention provides a landing-gear assembly for an aircraft, the landing-gear assembly comprising:
- an axle shaft arranged to carry wheels for enabling the aircraft to run on the ground;
- a leg presenting a first portion carrying said axle shaft and a second portion adapted to be connected to a carrier structure of the aircraft, said leg extending along a main axis of the leg passing via said first and second leg portions;
- a main damper arranged to damp axial movements of the first leg portion relative to the second leg portion; and
- a first secondary damper distinct from the main damper.

This landing-gear assembly of the invention is essentially characterized in that said first secondary damper is carried by said axle shaft, said first secondary damper comprising:
- an inertial mass; and
- connection means connecting said inertial mass to said axle shaft in order to enable it to move along at least one first axis of movement of said inertial mass relative to the axle shaft and in order to enable it to oscillate along said at least one first axis of movement on either side of a stationary rest position relative to the axle shaft, said connection means being adapted to damp said movements of said inertial mass relative to said axle shaft along said at least one first axis of movement, said first axis of movement extending in a plane perpendicular to said main axis.

The secondary damper forms a "mass+connection means" assembly that is carried exclusively by the axle shaft and that serves to damp the movements of the first leg portion (lower leg) in a plane perpendicular to the main axis of the leg relative to the second leg portion. Depending on circumstances, these relative movements damped by the secondary damper may be:
- angular oscillating motion in turning of the first leg portion (lower leg) about said steering axis; and/or
- linear oscillating motion in translation of the first leg portion relative to the second leg portion in a plane perpendicular to the main leg axis.

This angular oscillating motion in turning results from torsion of the leg about its main axis.

By way of example, the movements in translation result from the leg bending along its main axis leading to the first leg portion moving in a movement direction that is perpendicular to the main leg axis.

When the axle is set into movement in a plane perpendicular to the main leg axis (by the leg turning or bending), it then transmits energy to the inertial mass of the secondary damper via the connection means. In return, the inertial mass applies an opposing force to the lower leg assembly (first leg portion) via said same connection means, which serves to damp the oscillations. In the event of movement of the axle having a movement component about the first axis of movement, the inertial mass, under the effect of its inertia, opposes this movement of the axle and starts oscillating relative to the axle, around and on either side of its rest position which is stationary relative to the axle shaft. This oscillating motion of the inertial mass relative to the axle shaft is progressively damped by the connection means. This damping of the oscillating motion of the inertial mass serves to damp the oscillations of the first leg portion relative to the second leg portion.

The inertial mass M, and the connection means are preferably defined so as to target damping of the landing-gear assembly at a specific frequency.

By means of the invention, the first secondary damper is carried only by the axle shaft and it is thus placed in the proximity of zones of the leg in which there are the greatest angular and axial amplitudes of oscillation between the first and second portions of the leg. Shimmy damping is thus improved since it is performed in the proximity of the source of the oscillation, i.e. the wheels that transmit force/vibration while running on the ground.

In addition, the fact that the secondary damper is carried only by the axle, i.e. entirely on the axle, makes it easier to incorporate in the landing-gear assembly, since none of the parts of the landing-gear assembly, except possibly the axle, needs to be modified in order to incorporate the shimmy-damping function.

The invention may be applied both to a landing-gear assembly having its main leg axis intersecting the axle shaft, said axle shaft being perpendicular to the main leg axis, and also to a landing-gear assembly having its main leg axis spaced apart from the axle shaft, thereby increasing the damping effect provided by the secondary damper.

In that configuration, the first axis of movement of the inertial mass of the first secondary damper lies at a distance from the main axis of the leg.

In addition, the invention may be applied to a landing-gear assembly optionally presenting a steering mechanism adapted to steer the first portion of the leg relative to the second portion of the leg by turning the first leg portion about a steering axis parallel to said main leg axis (the steering axis generally coincides with the main leg axis).

If the landing-gear assembly of the invention is used as a main aircraft landing-gear assembly, it will then generally not be provided with a steering mechanism, the lower portion of the leg (first leg portion) thus being blocked against turning relative to the top of the leg (second leg portion) by scissor linkages. Such scissor linkages are not completely stiff, and thus leave some degree of flexibility in the assembly (a degree of freedom for the bottom of the leg to turn relative to the top of the leg). Shimmy leads to oscillating motion of the bottom of the leg relative to the top of the leg about the main leg axis as a result of said flexibility.

If the landing-gear assembly of the invention is used as a nose landing-gear assembly, it will then be provided with said steering mechanism.

In this embodiment, the steering torque is transmitted by the steering mechanisms at the bottom of the leg (first portion), generally via top and bottom scissor linkages. These scissor linkages are not completely stiff, and thus likewise leave a degree of flexibility in the assembly. Shimmy leads to oscillating motion of the bottom of the leg relative to the top of the leg about the main leg axis as a result of said flexibility.

BRIEF DESCRIPTION OF THE DRAWINGS

The invention can be better understood in the light of the following description of particular non-limiting embodiments of the invention, given with reference to the figures of the accompanying drawings, in which:

FIG. 1b is a diagrammatic view corresponding to the first secondary damper shown in FIG. 1a;

FIG. 3 shows, the behavior of two landing-gear assemblies in terms of free angular oscillations about their steering axes, in response to typical angular torsion, one of said landing-gear assemblies not including a secondary damper and the other including one secondary damper as shown in FIG. 1a or two secondary dampers as shown in FIG. 2a or as shown in FIG. 4a;

DETAILED DESCRIPTION OF THE INVENTION

Figure 1A:
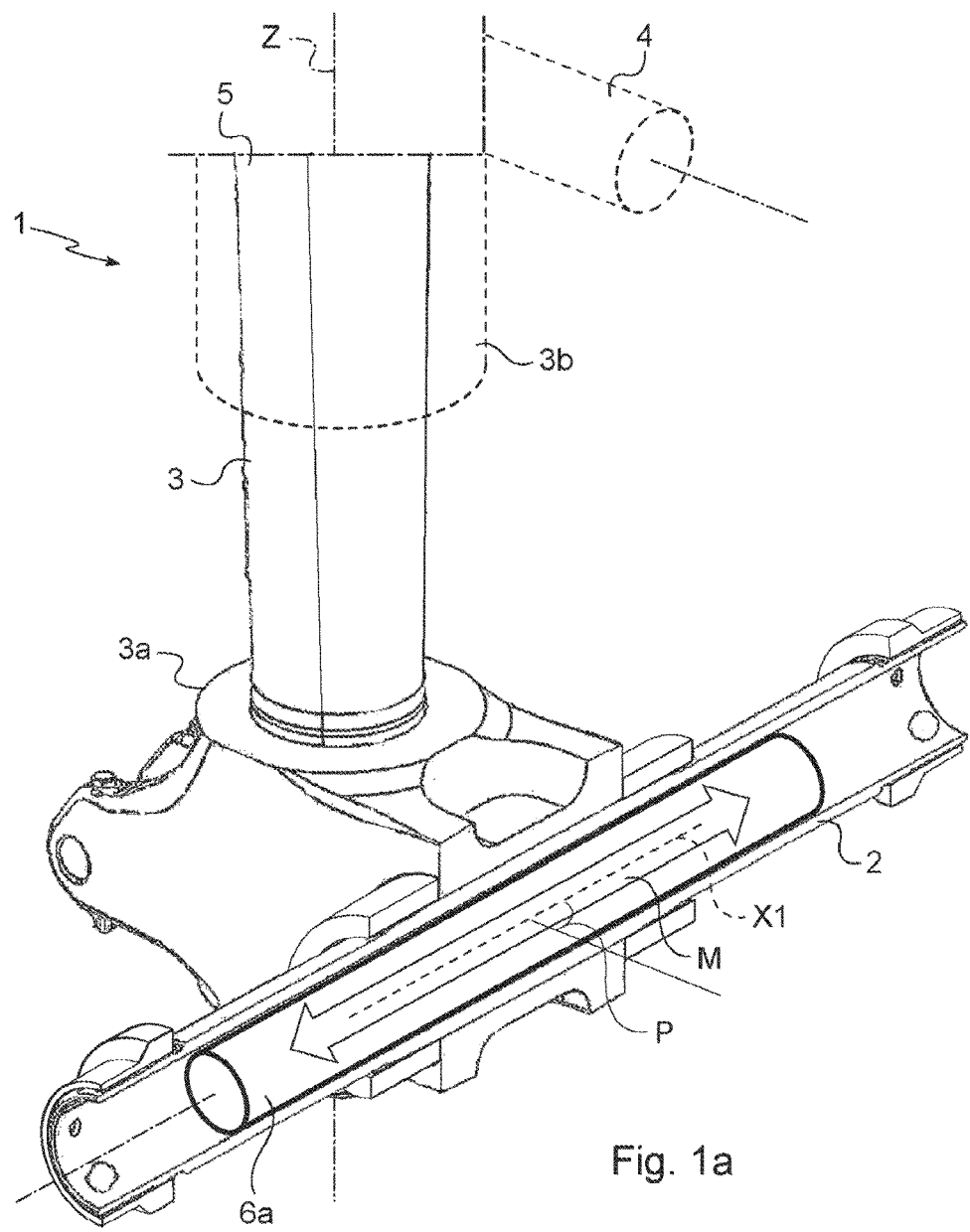
FIG. 1a shows a first embodiment of the landing-gear assembly of the invention in which the first secondary damper is located in a longitudinal opening inside the axle shaft.

As described above, and shown in FIGS. 1a, 2a, and 4a, the invention relates to an aircraft landing-gear assembly 1 comprising an axle shaft 2 arranged to carry wheels for enabling the aircraft to run on the ground.

The landing-gear assembly 1 includes a leg 3 extending along a main leg axis Z and presenting a first portion 3a carrying said axle shaft 2 and a second portion 3b suitable for being connected to a carrier structure belonging to the aircraft. The main axis Z passes via the first and second leg portions 3a, 3b.

A main damper 5 of the landing-gear assembly 1 is arranged to damp axial movements of the first leg portion 3a relative to the second leg portion 3b along a main axial axis of movement of the first leg portion 3a relative to the second leg portion 3b. In this embodiment, said main axis of movement coincides with the main leg axis Z.

The second leg portion 3b may comprise a strut box in which the first leg portion 3a slides, the main damper 5 being located at least partly inside said box.

Figure 2A:
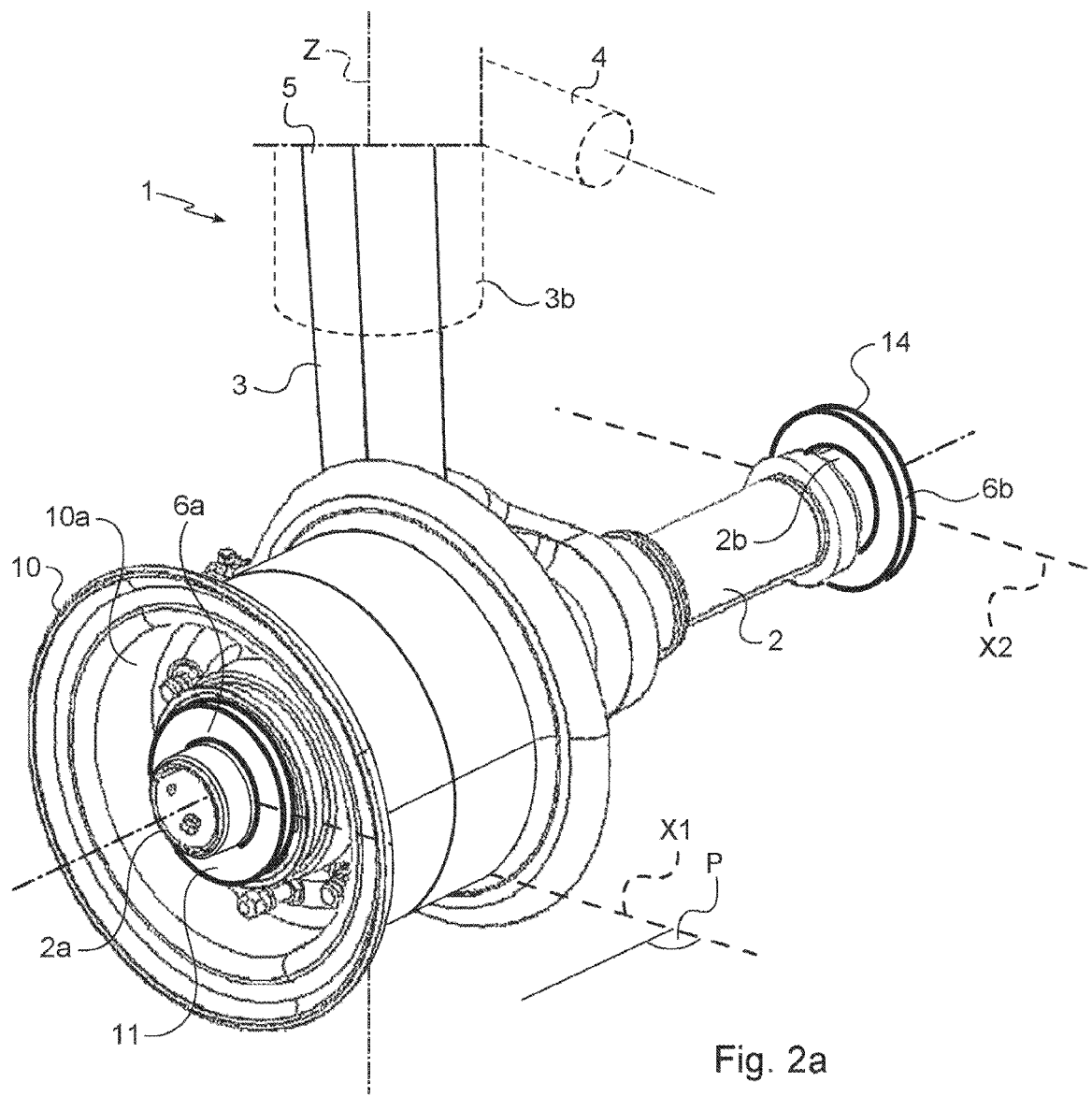
FIG. 2a shows a second embodiment of the landing-gear assembly of the invention in which there are two secondary dampers, each placed at a corresponding end of the axle shaft, if possible each secondary damper is positioned at least in part inside the corresponding wheel rim and is preferably positioned in full inside the corresponding wheel rim.
Figure 4A:
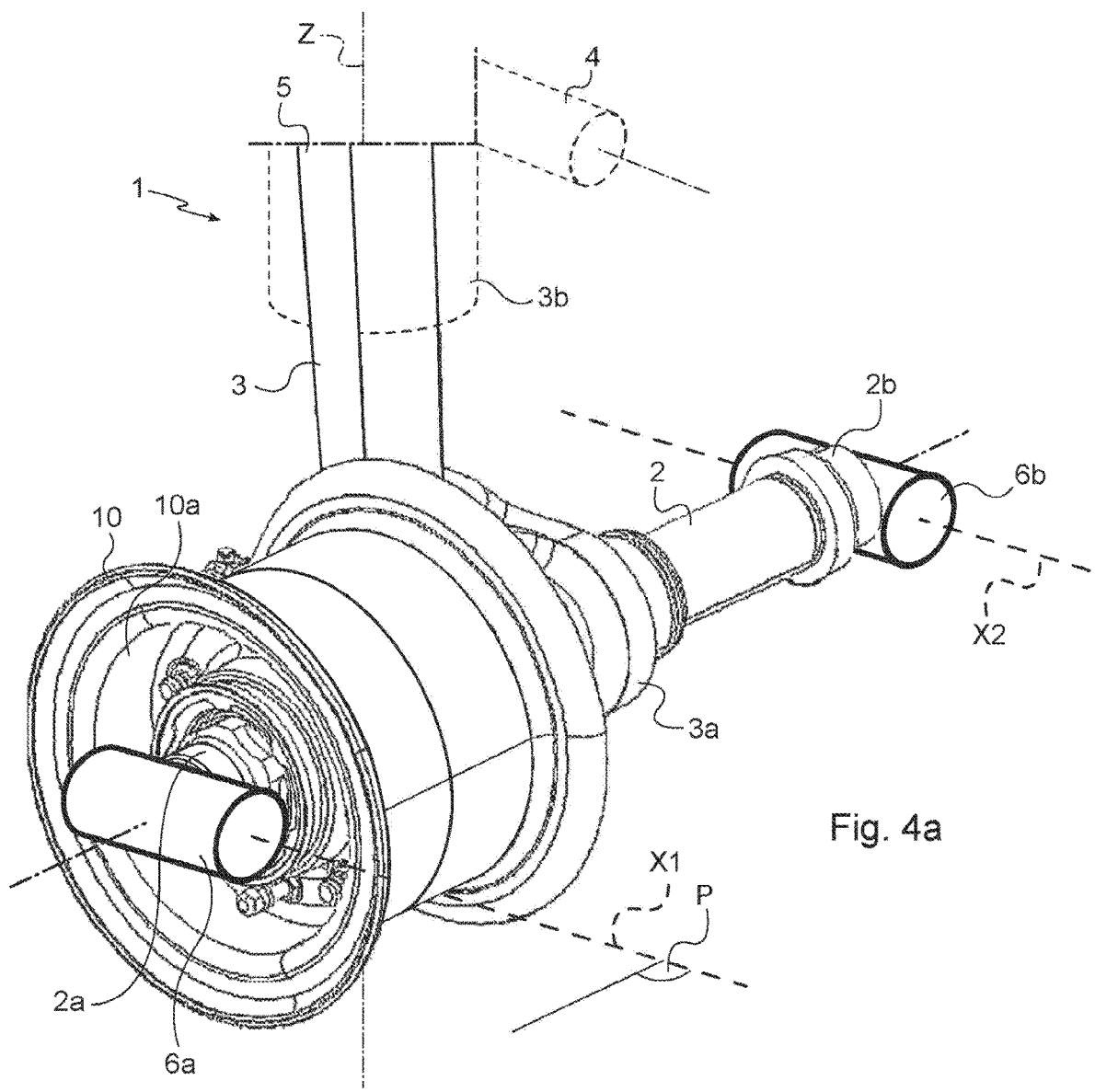
FIG. 4a shows a third embodiment of the landing-gear assembly of the invention in which there are two secondary dampers each placed at a respective end of the axle shaft, in this embodiment said dampers are linear dampers that, where possible, extend inside one of the wheel rims of the landing-gear assembly.

In certain embodiments of the invention, such as those shown in FIGS. 1a, 2a, and 4a, the landing-gear assembly 1 may include a steering mechanism 4 for steering it that is suitable for steering the first portion 3a of the leg relative to the second portion 3b of the leg by turning the first leg portion about/relative to a steering axis that extends along the leg 3. This steering axis may coincide with the main leg axis Z. A landing-gear assembly provided with such a steering mechanism is generally used as a nose wheel assembly for an aircraft.

As described above, the invention may also concern landing-gear assemblies not including a steering mechanism. Such assemblies are generally used for the main landing-gear in aircraft.

It should be observed that the axial movement of the first leg portion 3a relative to the second leg portion 3b is movement of the first leg portion 3a in translation along a main axis of movement that is preferably parallel to and possibly coincides with said main leg axis Z and with the steering axis of the aircraft.

In order to limit oscillation phenomena of the landing-gear assembly about the main leg axis Z (shimmy phenomena), a first secondary damper 6a is adapted to damp the oscillating motion of the first leg portion 3a relative to the second leg portion 3b. This first secondary damper 6a that is carried by the axle shaft 2 comprises:
  an inertial mass M; and
  connection means 7a connecting said inertial mass M to said axle shaft 2.

Said connection means 7a are adapted to damp movements of said inertial mass M relative to the axle shaft 2 about at least one first axis of movement X1 of said inertial mass M relative to the axle shaft 2.

As can be seen in the various FIGS. 1a to 2b, and 4a, 4b, this first axis of movement X1 extends in a plane P that is perpendicular to the main leg axis Z and that is located at a distance from said axis Z. It should be observed that the inertial mass M is carried only by the connection means 7a, which are themselves attached to the axle shaft 2.

Since the inertial mass M of the first secondary damper 6a is connected to the axle shaft 2 via connection means 7a that provide damping of the motion of the inertial mass M relative to the axle shaft 2 along at least the first axis of movement X1, which itself extends in a plane P that is perpendicular to the main axis Z, the motion of the inertial mass M relative to the axle shaft 2 gives rise to damping of oscillation about the axis Z.

This damping of oscillation about the main axis Z serves to damp the oscillating motion of the first portion 3a of the leg relative to the second portion 3b of the leg. The greater the distance between the first axis of movement X1 of the inertial mass M and the main axis Z, the more effective the device.

In the embodiment shown in FIG. 1a, the first axis of movement X1 coincides with the axle shaft 2 since the inertial mass M is inside the axle shaft, the axis of movement X1 extending along the axle shaft. In this embodiment, the distance between the axis X1 and the main leg axis Z is equal to the distance between the axle shaft 2 and the main axis Z. The first secondary damper 6a thus has an effect of reducing the shimmy phenomenon. In the embodiment of FIG. 1a, the inertial mass M serves to damp motion of the first leg portion relative to the second leg portion that presents at least one movement component in movement along the axis X1. By way of example, damping may be performed on a movement of the first portion 3a in turning about the axis Z or in translation radially relative to the axis Z, or on complex movements combining both angular oscillations and oscillations in translation.

Ideally, the inertial mass M is carried only by the connection means 7a, which implies that it is subjected only to inertia forces and to mechanical forces transmitted via the connection means 7a.

Damping of the movements of the inertial mass M relative to the axle shaft 2 is thus easily controllable via the connection means 7a alone, without having to modify the rest of the landing-gear assembly 1.

Preferably, the connection means 7a are not only adapted to damping movement of the inertial mass M relative to said axle 2 along the first axis of movement X1, but they are also adapted to guide movements of the inertial mass M relative to the axle 2 along the first axis of movement X1 of the inertial mass M relative to the axle shaft 2. The connection means 7a thus perform the functions both of guiding and of damping movements of the inertial mass M along the first axis of movement X1.

Figure 1B:
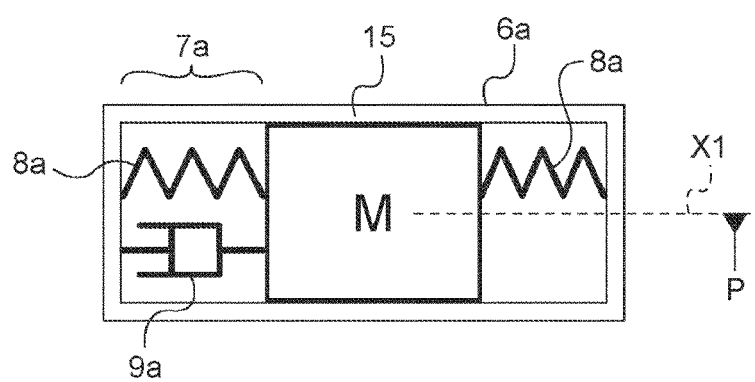
Figure 2B:
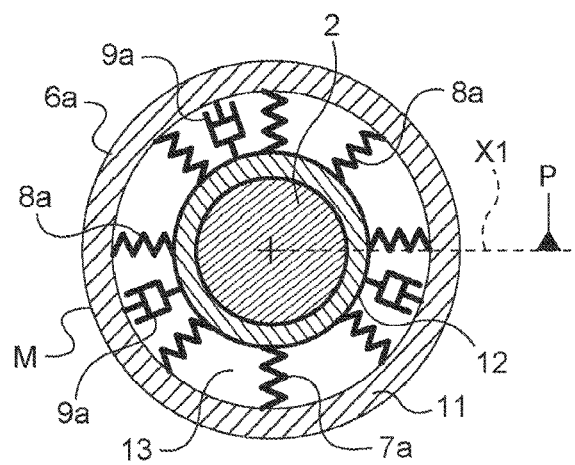
FIG. 2b is a diagram of a secondary damper corresponding to the first and second secondary dampers in the landing-gear assembly of FIG. 2a, in this embodiment, the secondary damper is of annular shape with an annular inertial mass carried on the outside of a damper ring that is itself carried by a fastener ring for engaging around the axle shaft.
Figure 4B:
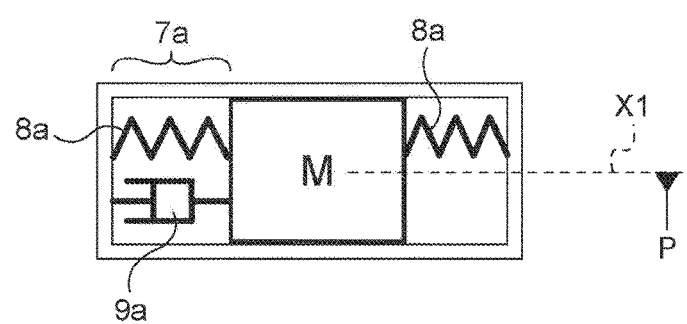
FIG. 4b is a diagram of a secondary damper corresponding to the first and second secondary dampers used in the landing-gear assembly of FIG. 4a, in this embodiment the secondary damper is of cylindrical shape with an inertial mass that can be moved along a mass movement axis X1 with connection means connecting said inertial mass M to the shaft, said connection means damping the movements of said inertial mass relative to the shaft about the axis X1.

As shown in FIGS. 1b, 2b, and 4b, the connection means 7a of the first secondary damper 6a that connect the inertial mass M to the axle shaft 2 comprise:
  resilient return means 8a for returning the inertial mass M towards said stationary rest position of the inertial mass relative to the axle shaft 2; and
  damper means 9a that present a damping coefficient of predetermined value $\underline{c}$.

As shown in FIGS. 1b and 4b, the resilient means 8a may be implemented by means of one or more springs that are stressed to a greater or lesser extent as a function of the position of the inertial mass M relative to the axle shaft. In these figures, the resilient means 8a of a secondary damper comprise two springs mounted in opposition at opposite ends of the inertial mass M. Ideally, these springs are prestressed in order to bring the mass towards a predetermined rest position. Naturally, other types of resilient means 8a may be envisaged in place of a spring: use may be made of one or more parts made of a resilient polymer material.

The damper means 9a may be made by associating:
  one or more chambers of internal volume that varies as a function of the movement of the inertial mass M relative to the axle shaft 2; with
  one or more constrictions for the flow of fluid between the inside and outside of said chamber(s). A constriction makes it possible to limit the flow of fluid towards the chamber or out from the chamber, thereby generating damping.

Although, in this example, the resilient return means 8a and the damper means 9a are shown in the form of separate mechanical means, it is nonetheless possible to implement said resilient means 8a and said damper means 9a as at least one part made of a material, such as an elastomer, that presents both resilient characteristics (elastic stiffness) and damping characteristics (damping coefficient).

The value of the damping coefficient $\underline{c}$ is predetermined so that the connection means 7a of the first secondary damper 6a are adapted to damp the movement of the inertial mass M relative to the axle shaft 2 and along the first axis of movement X1.

The resilient return means 8a present a stiffness constant of value $\underline{k}$ along the first axis of movement X1 of the inertial mass M relative to the axle shaft 2.

Figure 3:
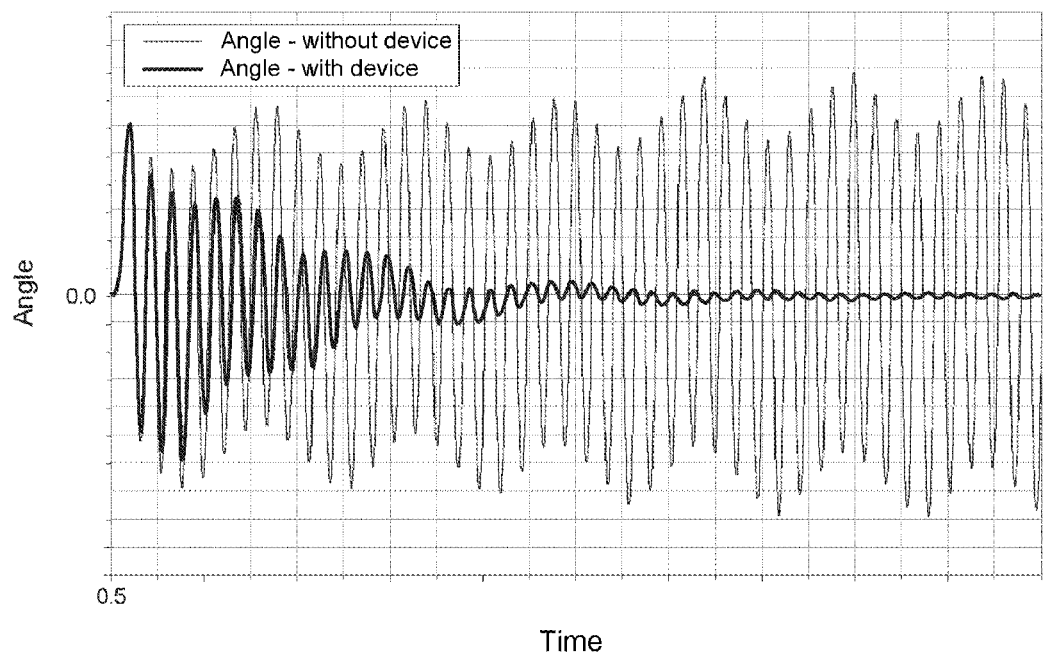

In FIG. 3:
  the fine line shows the angular oscillating motion about the main leg axis Z of a landing-gear assembly not including a secondary damper carried by the axle shaft; and the thick line shows the angular oscillating motion about the main axis Z of a landing-gear assembly fitted with a secondary damper carried by the axle.

For each of these curves, the angular oscillating motion is obtained by mechanically exciting the landing-gear assembly under predetermined and constant exciting conditions. By way of example, the applied excitation could be typical angular twisting of the leg about the main axis Z.

When the landing-gear assembly does not include a secondary damper, the free angular oscillation about the axis Z presents an amplitude of oscillation that is sustained and substantially constant over time.

In contrast, with a landing-gear assembly of the invention, i.e. fitted with at least one secondary damper for the axle shaft, the angular amplitude of oscillation is observed to be damped strongly during the first second after the start of free oscillation (see thick line curves).

In a particular embodiment of the invention, the damping coefficient and stiffness constant values $\underline{c}$ and $\underline{k}$ of each secondary damper may be adjustable and selected within predetermined ranges of values. This makes it possible to adapt the damping characteristics of the secondary dampers to the type of landing-gear assembly that is concerned.

The value of the inertial mass M also acts on the efficiency of the system. Typically, the inertial mass M value of each secondary damper is selected as a function of the amount of damping of the shimmy phenomenon that is desired from each damper.

As can be understood from FIGS. 1a, 2a, and 4a, three main embodiments of the invention are envisaged.

In the first of said three embodiments (see FIGS. 1a and 1b), the first axis of movement X1 of the inertial mass M of the first secondary damper 7a extends along the axle shaft 2.

For this purpose, the axle shaft 2 may be made to be tubular and the first secondary damper 6a may be placed inside said tubular axle shaft 2.

In this embodiment, the axle shaft 2 is hollow along its entire length, the first secondary damper 6a being arranged entirely inside the axle shaft 2. The first axis of movement X1 of the inertial mass M relative to the axle 2 extends along the axle shaft and inside said axle shaft 2.

In this embodiment, the first secondary damper 6a may include a guide 15 extending along the inertial mass M, between said inertial mass and an inside face of the axle shaft. The inertial mass M may thus slide inside and along the guide 15 in the form of a tube, without coming into contact against the axle shaft. This avoids any risk of wear on the axle shaft as a result of the oscillations of the inertial mass M.

In alternative embodiments of the invention, as shown in FIGS. 2a and 4a, the axle shaft 2 carries a second secondary damper 6b.

Said second secondary damper 6b comprises:
a second inertial mass M; and
second connection means connecting said second inertial mass M to said axle 2 in order to enable it to move along at least one second movement axis X2 of said second inertial mass M relative to the axle shaft 2 and in order to enable it to oscillate along said at least one second axis of movement X2 on either side of a stationary rest position of said second inertial mass M relative to the axle shaft 2, said second connection means being suitable for damping said movements of said second inertial mass M relative to said axle along said at least one second axis of movement X2.

This second axis of movement X2 extends in a plane P that is perpendicular to said main leg axis Z (in this embodiment coinciding with the steering axis) and at a distance from said axis Z. The axle shaft 2 extends between first and second ends 2a, 2b of the axle shaft 2. The first secondary damper 6a is carried by the first end 2a of the axle shaft 2 while the second secondary damper 6b is carried by the second end 2b of the axle shaft 2.

This second inertial mass M is thus arranged to be able to move relative to the axle shaft 2 along said second axis of movement X2. The second connection means enable said second inertial mass M to oscillate on either side of a rest position that is specific thereto, said oscillation being performed along said second axis of movement X2. These same second connection means damp said oscillatory movement of the second inertial mass M relative to the axle shaft X2. Said damping of the oscillating motion of the second inertial mass leads to damping of the relative movements between the first and second portions of the leg 3.

In the embodiments of the landing-gear assembly where there are a plurality of secondary dampers:
the inertial mass of said first secondary damper may be referred to as the first inertial mass;
the inertial mass of the second secondary damper is referred to as the second inertial mass; and
the connection means of the first secondary damper may be referred to as the first connection means.

Ideally, the first connection means of the inertial mass of the first secondary damper and the second connection means of the inertial mass of the second secondary damper, present a single damping coefficient value $\underline{c}$. In addition, in the embodiments in which the landing-gear assembly includes first and second dampers 6a, 6b, the first axis of movement of the first inertial mass of the first secondary damper is preferably parallel to the second axis of movement X2 of the second inertial mass M of the second secondary damper 6b. This enables the two secondary dampers to behave symmetrically.

FIGS. 2a, 2b, 4a, 4b show two particular embodiments of the invention in which there are first and second secondary dampers assembled at the ends 2a, 2b of the axle shaft. In these embodiments, the axle shaft 2 has the first secondary damper 6a fitted at its first end and the second secondary damper 6b fitted at its second end 2b.

It can be seen that the landing-gear assembly includes a first rim 10 for supporting a first wheel for enabling the aircraft to run on the ground and a second rim (not shown for reasons of clarity) for supporting a second wheel for enabling the aircraft to run on the ground. Said first and second rims are mounted to rotate about the axle shaft 2 and around said shaft. In each of these embodiments, the first secondary damper 6a is arranged at least in part inside a hollow zone 10a of the first rim 10 and the second secondary damper 6b is arranged at least in part inside a hollow zone of the second rim. In order to limit overall size, it is preferable for each first and second secondary damper to be arranged in full inside the hollow zone of the corresponding rim.

In the embodiment of FIGS. 2a and 2b, the inertial mass M of the first secondary damper 6a is in the form of a ring 11 and extends around the first end 2a of said axle shaft. The second inertial mass of the second secondary damper 6b is also in the form of a ring 14 and extends around the second end 2b of said axle shaft 2.

The connection means 7a that connect the inertial mass M of the first secondary damper 6a to the axle shaft 2 comprise:
a first fastener ring 12 fastened to the axle shaft 2; and
a resilient annular sleeve 13 coaxial with the inertial mass M of the first secondary damper 6a.

Said resilient annular sleeve 13 is placed between the first fastener ring 12 and the inertial mass M of the first secondary damper 6a.

Ideally, in this embodiment, the connection means of the second secondary damper 6b also include a fastener ring, referred to as the second fastener ring. This second fastener ring is fastened to the axle shaft 2. The second secondary damper 6b also includes a resilient annular sleeve coaxial with the second inertial mass. Said resilient annular sleeve is placed between the second fastener ring and the second inertial mass, in the form of a ring 14.

In this embodiment:
firstly, the resilient annular sleeve 13 of the first secondary damper 6a extends between the fastener ring 12 and the inertial mass M of the first secondary damper 6a; and
secondly, the resilient annular sleeve of the second secondary damper 6b extends between the fastener ring and the inertial mass of the second secondary damper 6b.

Each resilient annular sleeve can be made of a polymer material that is suitable for dissipating energy that enables movement between the inertial mass and the axle shaft to be damped.

The first and second secondary dampers 6a, 6b are similar to each other and each has an inertial mass M in the form of a ring of the same given weight, a fastener ring and a resilient sleeve connecting the inertial mass to the fastener ring, the sleeve having the same damping coefficient value $c$ and the same resilient stiffness value $k$. The advantage of this type of secondary damper provided with an inertial mass in the form of a ring is being able to damp oscillations about a plurality of axes of movement that are radial or axial relative to the axis of revolution of the ring.

In the embodiment in FIGS. 4a and 4b, the first and second secondary dampers 6a, 6b are linear dampers. The term "linear damper" makes reference to the fact that the damper has an inertial mass moving along a single given axis of the damper.

The first axis of movement X1 of the inertial mass M of the first secondary damper 6a is parallel to the second axis of movement X2 of the second inertial mass M of the second secondary damper 6b.

Said first and second axes of movement X1, X2 of the inertial masses M of the first and second secondary dampers 6a, 6b are preferably perpendicular to the axle shaft 2 and preferably parallel to each other.

This type of linear damper serves to damp only angular oscillations about the axis Z.

The invention is not limited to the above description, in particular it is possible for a single landing-gear assembly to include a plurality of secondary dampers such as those of FIGS. 1a, 2a, 4a, each of said secondary dampers being carried in full in the axle shaft.

The invention claimed is:

1. A landing-gear assembly (1) for an aircraft, the landing-gear assembly comprising:
an axle shaft (2) arranged to carry wheels for enabling the aircraft to run on the ground;
a leg (3) presenting a first portion (3a) carrying said axle shaft (2) and a second portion (3b) adapted to be connected to a carrier structure of the aircraft, said leg extending along a main axis of the leg passing via said first and second leg portions;
a main damper (5) arranged to damp axial movements of the first leg portion (3a) relative to the second leg portion (3b);
a first secondary damper (6a) distinct from the main damper (5), characterized in that said first secondary damper (6a) is carried by said axle shaft (2), said first secondary damper (6a) comprising:
an inertial mass (M); and
first connector (7a) connecting said inertial mass (M) to said axle shaft (2) in order to enable said inertial mass (M) to move about at least one first axis of movement (X1) of said inertial mass (M) relative to the axle shaft (2) and in order to enable said inertial mass (M) to oscillate along said at least one first axis of movement (X1) on either side of a stationary rest position relative to the axle shaft (2), said first connector (7a) being adapted to damp said movements of said inertial mass (M) relative to said axle shaft (2) about said at least one first axis of movement (X1), said first axis of movement (X1) extending in a plane (P) perpendicular to said main axis (Z).

2. The landing-gear assembly according to claim 1, wherein said first axis of movement (X1) of the inertial mass (M) of the first secondary damper lies at a distance from the main leg axis.

3. The landing-gear assembly according to claim 1, further comprising a steering mechanism (4) adapted to steering the first portion (3a) of the leg relative to the second portion (3b) of the leg by turning the first leg portion about a steering axis that is parallel to said main leg axis (Z).

4. The landing-gear assembly according to claim 1, wherein said first connector (7a) connecting said inertial mass (M) to said axle shaft (2) comprise:
resilient return means (8a) for returning the inertial mass (M) towards said stationary rest position of the inertial mass relative to the axle shaft (2); and
a damper (9a) that present a damping coefficient of predetermined value.

5. The landing-gear assembly according to claim 4, wherein said resilient return means (8a) present a stiffness constant value along the first axis of movement (X1) of the inertial mass (M) relative to the axle shaft (2).

6. The landing-gear assembly according to claim 1, wherein said first axis of movement (X1) of the inertial mass (M) of the first secondary damper (7a) extends along the axle shaft (2).

7. The landing-gear assembly according to claim 6, wherein said axle shaft (2) is tubular, the first secondary damper (6a) being placed inside said tubular axle (2).

8. The landing-gear assembly, according to claim 1, wherein said axle shaft (2) carries a second secondary damper (6b) comprising:
a second inertial mass (M); and
second connector connecting said second inertial mass to said axle in order to enable said second inertial mass to move along at least one second axis of movement (X2) of said second inertial mass (M) relative to the axle shaft (2) and in order to enable said second inertial mass to oscillate along said at least one second axis of movement (X2) on either side of a stationary rest position of said second inertial mass (M) relative to the axle shaft (2), said second connector being adapted to damp said movements of said second inertial mass (M) relative to said axle along said at least one second axis of movement (X2), said second axis of movement (X2) extending in a plane perpendicular to said main leg axis (Z) and at a distance from said main axis (Z), the axle shaft extending between first and second ends (2a, 2b) of the axle shaft (2), the first secondary damper (6a) being carried by the first end (2a) of the axle shaft (2)

and the second secondary damper (6*b*) being carried by the second end (2*b*) of the axle shaft (2).

9. The landing-gear assembly according to claim 8, wherein the first and second dampers (6*a*, 6*b*) are linear dampers, the first axis of movement (X1) of the inertial mass (M) of the first secondary damper (6*a*) being parallel to the second axis of movement (X2) of the second inertial mass (M) of the second secondary damper (6*b*).

10. The landing-gear assembly according to claim 8, further comprising a first rim (10) for supporting a first wheel for enabling the aircraft to run on the ground and a second rim for supporting a second wheel for enabling the aircraft to run on the ground, said first and second rims being mounted to rotate about the axle shaft (2), the first secondary damper (6*a*) being arranged at least in part inside a hollow zone (10*a*) of the first rim (10) and the second secondary damper (6*b*) being arranged at least in part inside a hollow zone of the second rim.

11. The landing-gear assembly, according to claim 10, wherein the inertial mass (M) of the first secondary damper (6*a*) is in the form of a ring (11) and extends around the first end (2*a*) of said axle shaft, the second inertial mass of the second secondary damper (6*b*) also being in the form of a ring (14) and extending around the second end (2*b*) of said axle shaft (2).

12. The landing-gear assembly according to claim 11, wherein said connection means (7*a*) adapted to connect said inertial mass (M) of said first secondary damper (6*a*) to said axle shaft (2) comprise a first fastener ring (12) fastened to the axle shaft (2) and a resilient annular sleeve (13) coaxial with the inertial mass (M) of said first secondary damper (6*a*), said resilient annular sleeve (13) being placed between the first fastener ring (12) and the inertial mass (M) of the first secondary damper (6*a*).

\* \* \* \* \*